April 21, 1936.  A. C. STALEY  2,037,830
PORTABLE AIR COMPRESSOR
Filed Oct. 2, 1933  3 Sheets-Sheet 3

INVENTOR
Allen C. Staley.
BY
ATTORNEY

Patented Apr. 21, 1936

2,037,830

UNITED STATES PATENT OFFICE 2,037,830

PORTABLE AIR COMPRESSOR

Allen C. Staley, Birmingham, Mich., assignor to Chrysler Corporation, Detroit, Mich., a corporation of Delaware Application October 2, 1933, Serial No. 691,814

12 Claims. (Cl. 230—211)

This invention relates to air compressors and more especially to a compressor unit of the portable type adapted to be constructed in the form of a trailer.

The main object of the invention is to provide an improved portable air compressor construction.

Another object is to provide a compact, light weight, economical construction of air compressor having a high degree of mobility.

Another object is to provide a novel arrangement of a multicylinder air compressor, a multicylinder internal combustion engine and flexible drive connection for operating the compressor from said engine, independent cooling systems for the engine and compressor, an air storage tank, fuel tank, and accessories, all mounted in a rigid frame of a trailer.

Another object is to provide a novel arrangement of compressor unit, drive means therefor, and accessories in combination with a novel trailer frame construction and means for connecting the trailer to a propelling vehicle whereby a short overall length of trailer is obtained while at the same time a high degree of mobility of the trailer and propelling vehicle is made possible.

Another object is to provide an air compressor unit including a compressor, an engine for operating the same, a drive connection between these units including speed reduction and resilient elements enabling the use of a relatively small engine and for eliminating shock by means of the drive connection between these units.

Another object resides in the provision of an engine and compressor unit made up largely of interchangeable parts whereby servicing the construction is simplified.

Another object is to provide a hitch ring resiliently mounted in the means for connecting a trailer to a propelling vehicle.

Other objects and advantages will become apparent from the following description and appended claims.

The invention involves an arrangement of multicylinder air compressor and engine units connected by a belt drive, each unit having an independent cooling system; an air tank; a fuel tank; a tool carrier and accessories, all mounted on a rigid frame of a trailer, and designed as a portable trailer type compressor adapted to furnish compressed air for operating a number of air driven tools such as, for example, four air drills or the like.

For the purpose of illustrating the genus of the invention; a typical production unit is shown more or less diagrammatically in the accompanying drawings, in which.

Figure 1:
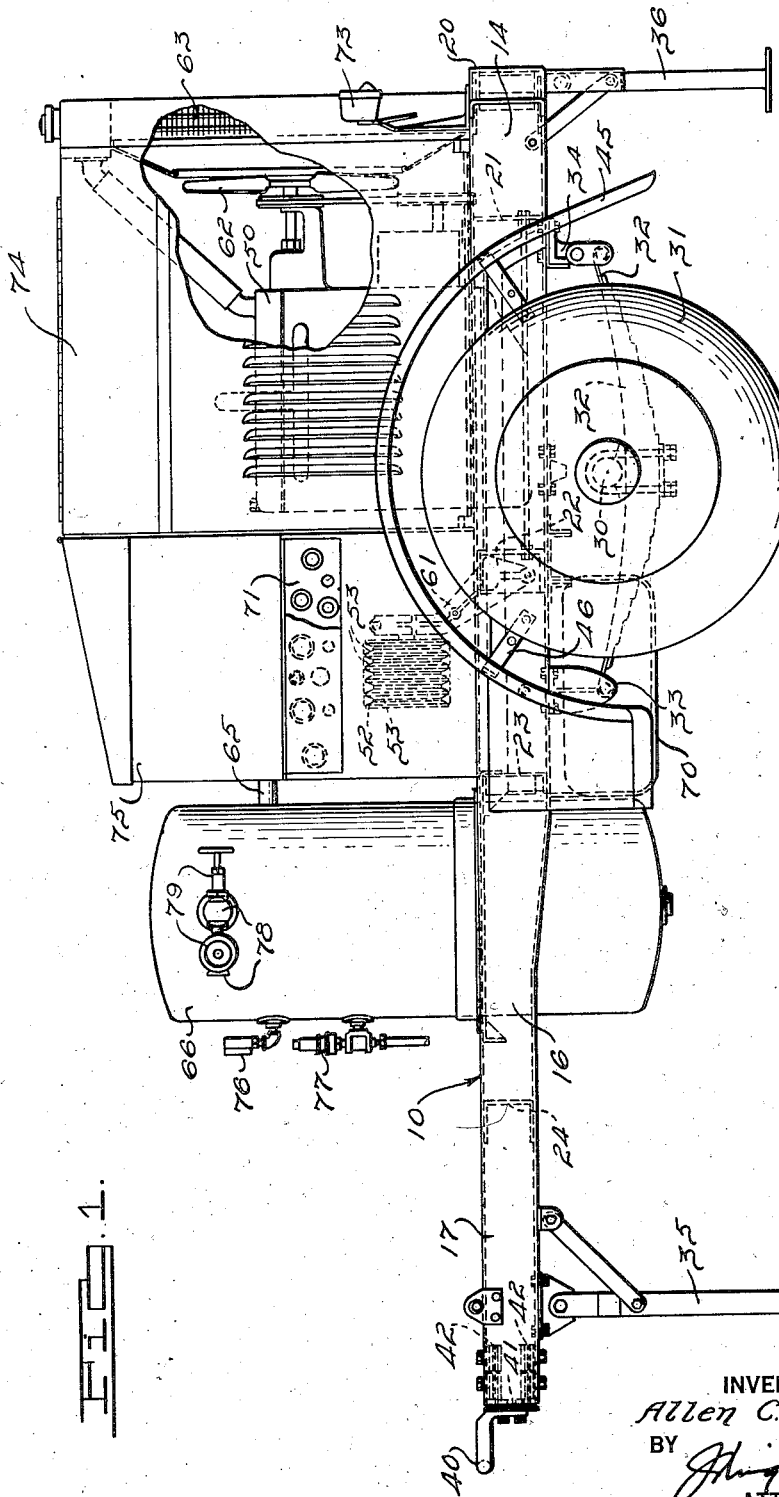
Figure 1 is a side elevation of a portable air compressor constructed in accordance with the principles of this invention.

Referring to the drawings, the numeral 10 indicates a trailer frame comprising side rails 11 and 12 each having portions 13 and 14 extending longitudinally of the frame and disposed in substantially parallel relation, portions 15 and 16 converging toward one another at one end of the frame and terminating in a draw bar portion 17. The side rails 11 and 12 are connected by suitable cross members 20, 21, 22, 23, and 24, the cross member 20 extending laterally beyond the rear ends of the side rails so as to constitute a rear bumper for the trailer. The cross members 21, 22 and 23 extend between the longitudinally disposed portions of the side rails, while the cross member 24 extends between the side rails at the draw bar portion 17 and at a point adjacent the converging portions 15 and 16, and the cross member 23 extends between the portions 13 and 14 of the side rails at a point adjacent the other ends of the converging portions 15 and 16.

A brace member 25 may be provided connecting the cross members 20, 21, and 22 and disposed midway of the width of the frame 10. Gusset plates 26 are provided at the rear corners formed by the side rails 11 and 12 and the cross member 20 and gusset plates 27 may be provided for connecting the brace member 25 to the cross member 20.

A wheel and axle assembly including independently rotatable wheels 31 and an axle 30 is connected to the frame 10 by springs 32 through the intermediary of fixed shackles 33 and shackle and link assemblies 34 so as to locate the axle 30 slightly in rear of the center of gravity of the trailer when fully equipped.

Front and rear end standards 35 and 36 are provided for maintaining the trailer in substantially horizontal position. With the trailer set up for operation it is normally supported by the front standard 35 and the wheels 31 and the standard 36 may provide additional support and anchorage in conjunction with trig blocks placed underneath the latter. A hitch ring 40 is provided at the forward end of the draw bar portion 17 and is connected to the latter through the intermediary of flange plates 41 and rubber blocks 42. Mud guards 45 may be provided for the wheels 31 and secured to the side sills 11 and 12 by brackets 46 in a more or less conventional manner. Fixed standards 37 may be provided on the bottom of cross member 20 to prevent crumpling of the rear ends of fenders 45 in the event that the trailer should become overbalanced with the standard 36 in retracted or elevated position.

Figure 2:
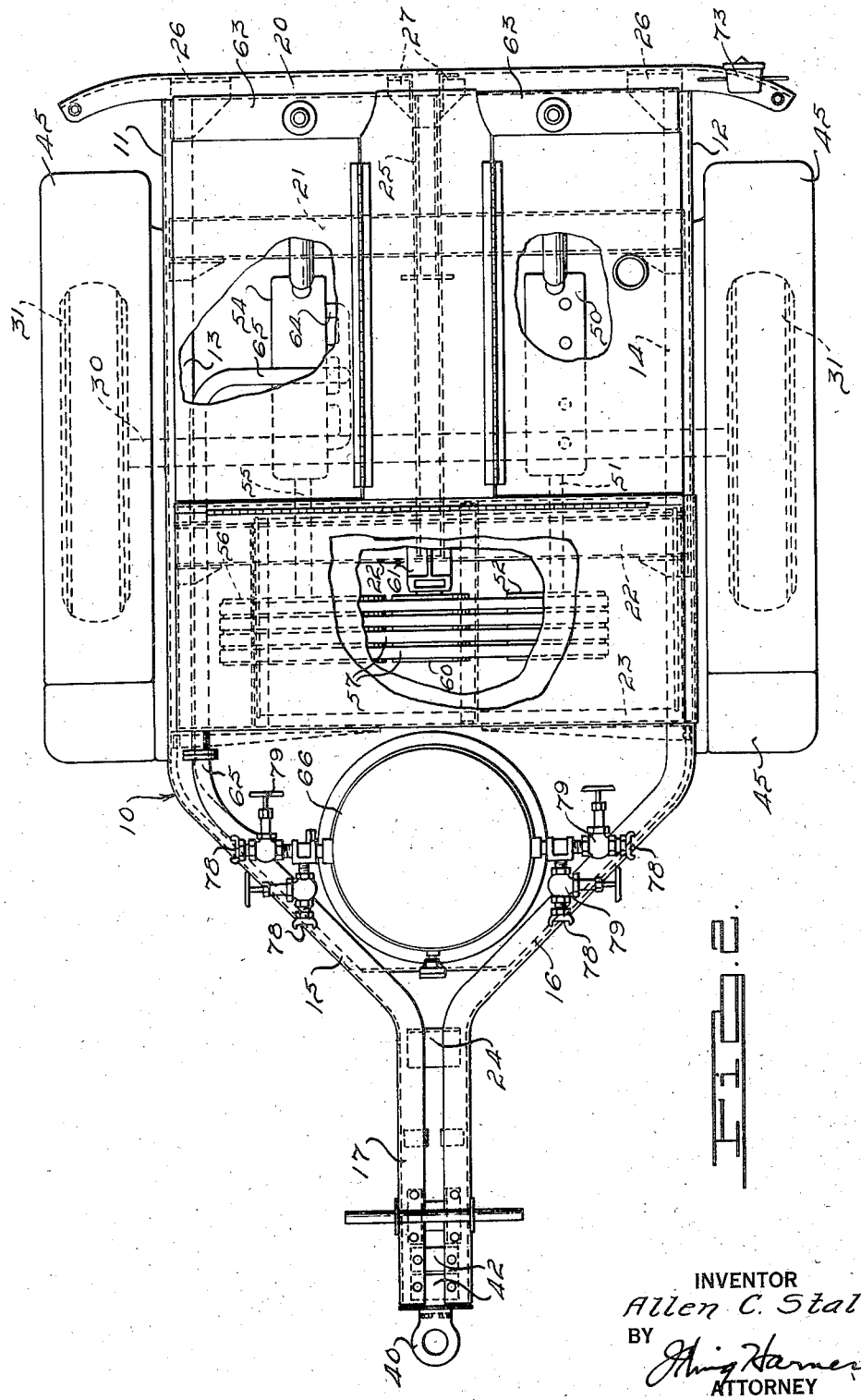
Fig. 2 is a top plan of the construction shown in Fig. 1.
Figure 3:
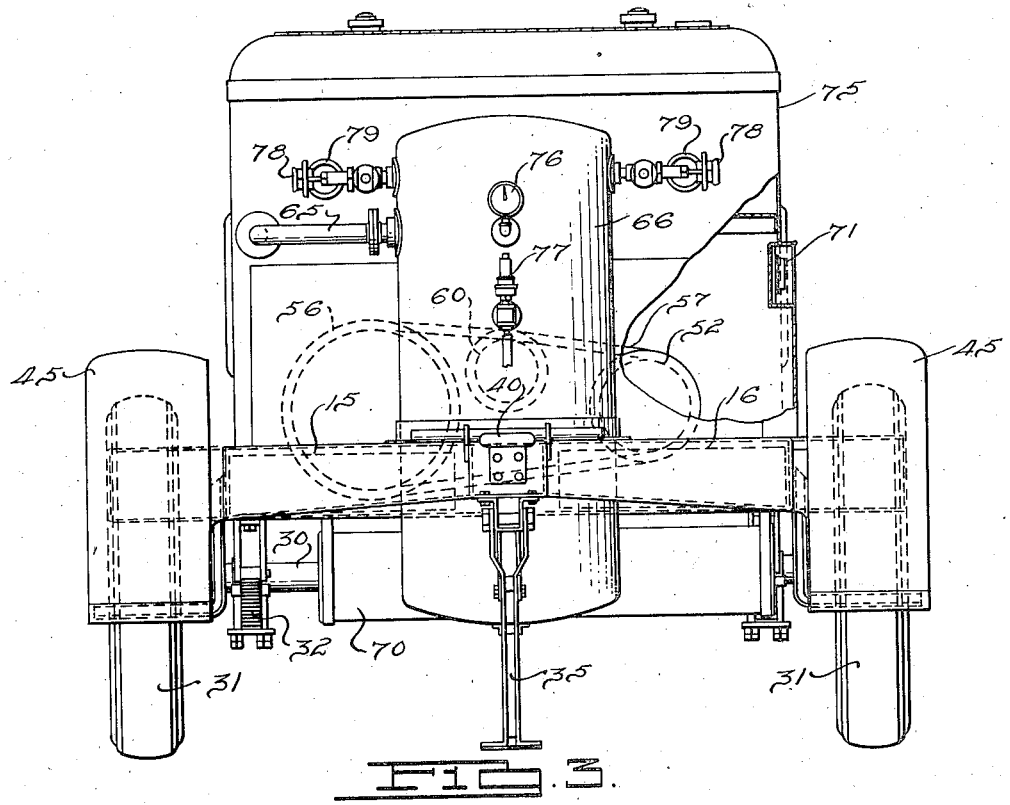
Figs. 3 and 4 are end elevations as viewed from the front and rear, respectively, of the construction shown in Figs. 1 and 2.
Figure 4:
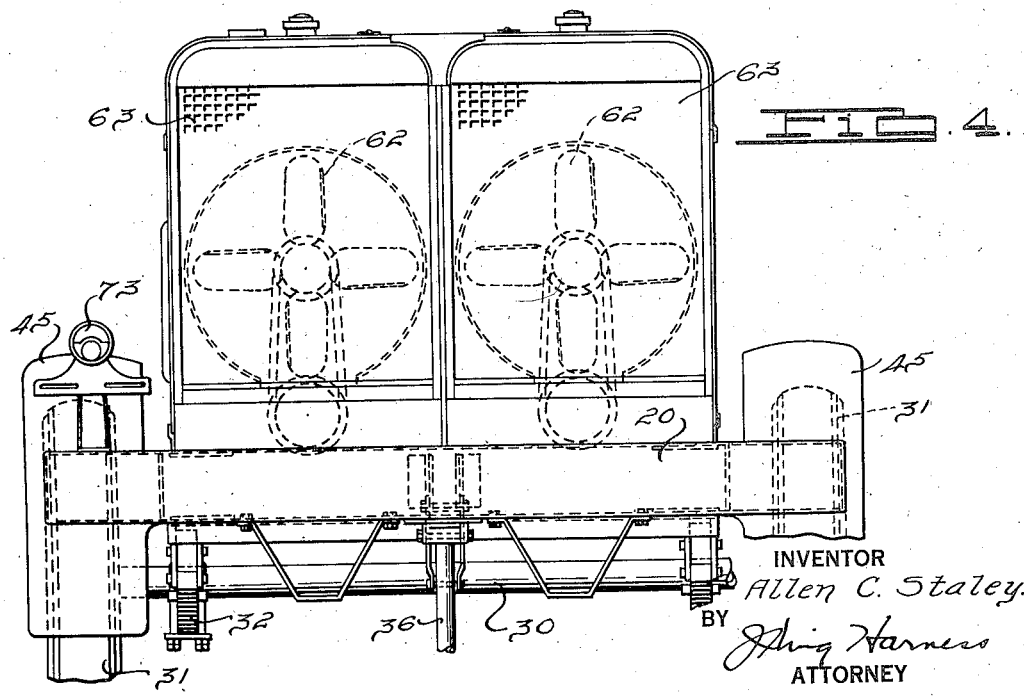

Referring more especially to Figs. 1 and 2 of the drawings, the arrangement of the air compressor, the motive means and the accessories therefor on the frame 10 will be described. At the right hand side of the rear half of the frame 10 as viewed from the front end thereof a multicylinder engine 50 is mounted longitudinally of the frame. The engine 50 may be mounted on the cross members 21 and 22 or on the brace 25 and side sill 12, or both, as desired. The crank shaft 51 of the engine is disposed in parallel relation with respect to the side sill 12 and terminates at the front end thereof in a shaft extending forwardly of the engine and on which is fixed a drive pulley 52 provided with grooves 53 for the reception of a plurality of V belts. At the opposite side of the frame 10 a compressor 54 is similarly mounted with its crank shaft 55 extending parallel with the portion 13 of the side rail 11. A pulley 56 is fixed to the forwardly extending end of the crank shaft 55 in alignment with the pulley 52 fixed to the crank shaft of the engine. A plurality of V belts 57 connect the pulleys 52 and 56 to provide a resilient drive connection between the engine and compressor. The diameter of the pulley 52 is smaller than that of the pulley 56 in the ratio of approximately 1 to 1.59 so that the speed of the compressor relative to that of the engine driving the same will be of approximately this value. An idler 60 is rotatably mounted on a standard 61 fixed to the cross member 22 to maintain the V belt 57 at the desired tension.

In the illustrated embodiment the engine 50 and compressor 54 are both of the four cylinder type with the cylinders arranged in line and each provided with a water cooling system. The compressor and engine are each provided with a cooling fan 62 driven thereby and an independent radiator 63 mounted at the rear end of the vehicle frame or on the side sills 11 and 12, gusset plates 26 and 27 and the cross member 20. The exact number of cylinders and types of engine and compressor employed is immaterial, however, the four cylinder, cast in block integral with crank case, four cycle engine of the general type employed in automobiles and trucks has been found very satisfactory. By employing a power take-off having the ratio indicated above, the engine and compressor may have the same size cylinder block and cylinder and the majority of the parts of each of these units may be common to both the engine and compressor, making interchangeability of parts and servicing a simple problem. The use of a resilient belt drive eliminates shock in the transmission of power between the engine and compressor. Air delivered by the compressor 54 is conveyed by an exhaust manifold 64 to a conduit 65 leading to an elongated, preferably cylindrical, air tank 66. The air tank 66 is mounted on the frame 10 between the converging portions 15 and 16 of the side sills 11 and 12 with its longitudinal axis normally disposed with respect to the central longitudinal axis of the frame 10. With this disposition of the air tank clearance is provided laterally of the sides of the converging portions 15 and 16 of the draw bar portion 17 for a towing or propelling vehicle so that the propelling vehicle and trailer can negotiate sharp degrees of curvature without interference between the trailer or parts carried thereby and the propelling vehicle.

The space above and below the power take-off is utilized for a tool and accessory chamber and for a fuel tank 70, respectively. An instrument panel 71 is mounted at the engine side of the power take-off and below the tool and accessory chamber. This panel may include air pressure gauge, speedometer, oil gauges for the engine and compressor, air meter, water temperature indicator, gasoline gauge, starter button, ignition, choke, throttle and tail light control. The engine 50 is provided with a self starter and an electrical generator may be operated from either the engine or compressor for recharging a storage battery which may be disposed in the space back of the instrument panel, or other desired location. A tail light 73 is mounted on the cross member and bumper 20. A hood 74 may be provided over the engine and compressor and arranged flush with the top and side margins of the radiators 63 and paneling 75 provided at the sides of the tool box and power take-off to enhance the appearance of the compressor construction. The air tank 66 is provided with a gauge 76 and safety valve 77 and with hose connections 78, each provided with an individual valve 79 so that a plurality of air driven tools, for example, from one to four air drills or similar air driven tools may be operated therefrom.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a compressor unit, a frame structure including side rails having longitudinally arranged portions and portions converging at one end of the frame, said converging portions terminating in a draw-bar portion, an air compressor, a prime mover for operating said compressor, a drive connection between said prime mover and compressor, said compressor and prime mover being mounted on said frame between the longitudinally extending portions of the side rails, and an air tank arranged with its longitudinal axis normal with respect to the central longitudinal axis of the frame and mounted between the converging portions of said side rails.

2. In a compressor unit, a frame structure including side rails having longitudinally arranged portions and portions converging at one end of the frame, said converging portions terminating in a draw-bar portion, a multicylinder air compressor mounted at one side of said frame and parallel with a longitudinally arranged portion of one of said side rails, a multicylinder engine mounted at the opposite side of said frame and parallel with the longitudinally arranged portion of the other side rail, drive means connecting said engine and compressor, said engine and compressor being mounted on said frame between the longitudinally extending portions of said side rails, and an air tank arranged with its longitudinal axis normal with respect to the central longitudinal axis of the frame and mounted between the converging portions of the side rails adjacent the draw-bar portion.

3. In a compressor unit, a supporting frame structure including side rails having longitudinally arranged portions and portions converging at one end of the frame, said converging portions terminating in a draw-bar portion, an air compressor, an engine for operating said compressor, drive means for connecting said engine and compressor, said engine and compressor being mounted on said frame between the longitudinally extending portions of said side rails, an air tank arranged between the converging portions of said side rails with the longitudinal axis of the tank normally disposed with respect to the central longitudinal axis of the frame, and a fuel tank arranged transversely of said frame below said drive means.

4. In a compressor unit, a supporting frame structure including side rails having longitudinally arranged portions and portions converging at one end of the frame, said converging portions terminating in a draw-bar portion, an air compressor, an engine for operating said compressor, drive means for connecting said engine and compressor, said engine and compressor being mounted on said frame between the longitudinally extending portions of said side rails, an air tank arranged between the converging portions of said side rails with the longitudinal axis of the tank normally disposed with respect to the central longitudinal axis of the frame, and independent cooling systems for said engine and compressor including separate radiators arranged side by side at the end of said frame opposite said draw-bar portion.

5. In a portable air compressor unit, a supporting frame structure including side rails having longitudinally extending portions and portions converging at one end of the frame, said converging portions terminating in a draw-bar portion arranged centrally of the frame to afford clearance for a propelling vehicle, independently rotatable wheels arranged one at each side of said frame for supporting the latter, a compressor and motor means therefor mounted on said frame between said longitudinally extending portions of the side rails, and an air tank arranged with its longitudinal axis normal to the central longitudinal axis of the frame and mounted on said frame between the converging portions of said side rails.

6. In a portable air compressor unit, a supporting frame structure including side rails having longitudinally arranged portions and portions converging at one end of the frame, said converging portions terminating in a draw-bar portion, a multicylinder engine mounted at one side of said frame, a multicylinder air compressor mounted at the opposite side of said frame, said engine and compressor each having a crank shaft disposed longitudinally of said frame, a drive connection between said crank shafts including speed reduction and resilient elements, an air tank mounted on said frame between the converging portions of said side rails, and conduit means connected with said compressor and said air tank.

7. In a compressor unit, a supporting frame structure including side rails having longitudinally arranged portions and portions converging at one end of the frame, said converging portions terminating in a draw-bar portion, a multicylinder engine mounted at one side of said frame, a multicylinder air compressor mounted at the opposite side of said frame, said engine and compressor each having a crank shaft disposed longitudinally of said frame, a belt drum fixed to each of said crank shafts, resilient belt means connecting said drums, an air tank mounted on said frame between the converging portions of said side rails, and conduit means connected with said compressor and said air tank.

8. In a compressor unit, a supporting frame structure including side rails having longitudinally arranged portions and portions converging at one end of the frame, said converging portions terminating in a draw-bar portion, a multicylinder engine mounted at one side of said frame, a multicylinder air compressor mounted at the other side of said frame, said engine and compressor each having a crank shaft disposed longitudinally of said frame, a belt drum fixed to each of said crank shafts, a drum fixed to the engine crank shaft being of a lesser diameter than that fixed to the compressor crank shaft, resilient means connecting said drums, an air tank mounted on said frame between the converging portions of said side rails, and conduit means communicating with said compressor and said air tank.

9. In a portable air compressor, a supporting frame structure including side rails having longitudinally extending portions and portions converging at one end of the frame, said converging portions terminating in a draw-bar portion arranged centrally of the width of the frame, independently rotatable wheels arranged one at each side of said frame for supporting the latter, an air compressor unit and a motive power unit therefor mounted on said frame between said longitudinally extending portions of the side rails, said units being symmetrically arranged with respect to the longitudinally extending portions of said side rails and the central longitudinal axis of said frame, and an air tank arranged with its longitudinal axis normal to said frame and mounted on said frame between the converging portions of said side rails, said air compressor unit and the motive power unit therefor including interchangeable parts.

10. In a portable air compressor, a supporting frame structure including side rails having longitudinally extending portions and portions converging at one end of the frame, said converging portions terminating in a draw-bar portion arranged centrally of the width of the frame, independently rotatable wheels arranged one at each side of said frame for supporting the latter, an air compressor unit and an engine unit for operating the same mounted on said frame between said longitudinally extending portions of the side rails, said units being symmetrically arranged with respect to the longitudinally extending portions of said side rails and the central longitudinal axis of said frame, and an air tank arranged with its longitudinal axis normal to said frame and mounted on said frame between the converging portions of said side rails, said engine unit and compressor unit being made up principally of interchangeable parts.

11. In a compressor construction, a frame structure including side rails having longitudinally arranged portions and portions converging at one end of the frame, said converging portions terminating in a draw-bar portion, an air compressor unit, a prime mover unit operatively connected with said compressor unit, and an air storage unit, said units being mounted on said frame structure, at least one of said units being mounted between the converging portions of said side rails.

12. In a compressor construction, a frame structure including side rails having longitudinally arranged portions, an air compressor unit, a prime mover unit operatively connected with said compressor unit, and an air storage unit, said units being mounted on said frame structure, two of said units being mounted on the respective opposite sides of the central longitudinal axis of said frame structure.

ALLEN C. STALEY.